United States Patent
Südow et al.

(10) Patent No.: US 8,335,126 B2
(45) Date of Patent: Dec. 18, 2012

(54) METHOD FOR COMPENSATING MARINE GEOPHYSICAL SENSOR MEASUREMENTS FOR EFFECTS OF STREAMER ELONGATION

(75) Inventors: Gustav Göran Mattias Südow, Vällingby (SE); Andras Robert Juhasz, Hägersten (SE)

(73) Assignee: PGS Geophysical AS, Lysaker (NO)

( * ) Notice: Subject to any disclaimer, the term of this patent is extended or adjusted under 35 U.S.C. 154(b) by 233 days.

(21) Appl. No.: 12/807,030

(22) Filed: Aug. 26, 2010

(65) Prior Publication Data

US 2012/0051175 A1    Mar. 1, 2012

(51) Int. Cl.
*G01V 1/38* (2006.01)
*G01V 1/18* (2006.01)
(52) U.S. Cl. ......................................... 367/19
(58) Field of Classification Search ............... 367/19–21, 367/13
See application file for complete search history.

(56) References Cited

U.S. PATENT DOCUMENTS

| | | | |
|---|---|---|---|
| 4,068,208 A | 1/1978 | Rice, Jr. et al. | |
| 6,256,090 B1 | 7/2001 | Chen et al. | |
| 7,221,619 B1 | 5/2007 | George | |
| 7,404,370 B2 | 7/2008 | Stokkeland | |
| 2010/0017133 A1 | 1/2010 | Ziolkowski et al. | |
| 2011/0203509 A1* | 8/2011 | Austad et al. ................. | 114/244 |
| 2011/0286301 A1* | 11/2011 | Seale ............................. | 367/16 |
| 2012/0051175 A1* | 3/2012 | Sudow et al. ................... | 367/19 |

FOREIGN PATENT DOCUMENTS

| | | |
|---|---|---|
| EP | 2128654 A2 | 4/2009 |
| EP | 2068175 A1 | 6/2009 |
| EP | 2360496 A1 | 8/2011 |
| GB | 2432911 A | 6/2007 |
| GB | 2458757 A | 10/2009 |

OTHER PUBLICATIONS

United Kingdom Search Report for Application No. GB1114655.2, dated: Nov. 4, 2011

* cited by examiner

*Primary Examiner* — Daniel Pihulic

(57) ABSTRACT

A method for determining a longitudinal position of at least one geophysical sensor on a towed marine streamer includes measuring a parameter related to tension at least one position along the streamer. A change in length of the streamer is determined using the measured parameter. The longitudinal position of the at least one sensor is determined. A marine streamer includes at least one geophysical sensor and at least one tension sensor capable of measuring a parameter related to axial tension.

20 Claims, 3 Drawing Sheets

METHOD FOR COMPENSATING MARINE GEOPHYSICAL SENSOR MEASUREMENTS FOR EFFECTS OF STREAMER ELONGATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine geophysical surveying. More specifically, the invention relates to systems for determining stretch in geophysical streamers as a result of towing forces.

Marine geophysical surveying systems such as seismic acquisition systems and electromagnetic survey systems are used to acquire geophysical data from formations disposed below the bottom of a body of water, such as a lake or the ocean. Such geophysical data may indicate geophysical structures and/or identify formations likely to contain useful materials such as water, oil, or natural gas. Marine seismic surveying systems, for example, typically include a seismic survey vessel having onboard navigation, seismic energy source control, and geophysical data recording equipment. The seismic survey vessel is typically configured to tow one streamer or, more typically, a plurality of laterally spaced apart sensor streamers through the water. At selected times, the seismic energy source control equipment causes one or more seismic energy sources (which may be towed in the water by the seismic vessel or by another vessel) to actuate. Signals generated by various sensors on the one or more streamers in response to detected seismic energy are ultimately conducted to the recording equipment. A record with respect to time is made in the recording system of the signals generated by each sensor (or groups of such sensors). The recorded signals are later interpreted to infer the structure and composition of the formations below the bottom of the body of water. Corresponding components (transmitters and receivers) for inducing electromagnetic fields and detecting electromagnetic phenomena originating in the subsurface in response to such imparted fields may be used in marine electromagnetic geophysical survey systems.

The one or more sensor streamers are in the most general sense long cables that have geophysical sensors disposed at spaced apart positions along the length of the cables. Streamer strain members may function to convey the axial load of the streamer, thereby preventing loading of other, more sensitive components. A typical streamer can extend behind the geophysical survey vessel for several kilometers. Due to manufacturing, transportation, and operational logistics, streamers are typically made up of a number of segments, connected at axial ends. Because of the great length of the typical streamer, large frictional forces are generated as a result of towing the streamers in the water. Such frictional forces can impart substantial axial loading on the streamers, thereby elongating the streamers. For example, some streamers may stretch approximately 0.5-1% under full operational load. During electromagnetic surveys, this may result in an over-estimation of roughly the same magnitude in the electric field measurement.

Accurate survey results depend on accurate knowledge of the distance between the energy source and each of the sensors on each streamer. For example, some electromagnetic surveys require absolute uncertainty of the measured result to be below about 1% to be able to accurately determine the resistivity of detected anomalies. There exists a need for a method to compensate for streamer elongation in measurements made by sensors in towed marine geophysical streamers.

SUMMARY OF THE INVENTION

A method according to one aspect of the invention for determining a longitudinal position of at least one geophysical sensor on a towed marine streamer includes measuring a parameter related to tension at least one position along the streamer. A change in length of the streamer is determined using the measured parameter. The longitudinal position of the at least one sensor is determined.

Another method according to an aspect of the invention for marine geophysical surveying includes towing at least one marine streamer in a body of water, wherein the streamer comprises at least one geophysical sensor. The method further includes measuring a parameter related to axial tension at least one position along the streamer. The method further includes determining a change in length of the streamer using the measured parameter. The method further includes, at selected times, actuating an energy source in the body of water. The method further includes recording signals detected by the at least one geophysical sensor. The method further includes compensating the recorded signals for the determined change in length of the streamer.

A marine streamer according to an aspect of the invention includes at least one geophysical sensor and at least one tension sensor capable of measuring a parameter related to axial tension.

Other aspects and advantages of the invention will be apparent from the following description and the appended claims.

DETAILED DESCRIPTION

Figure 1:
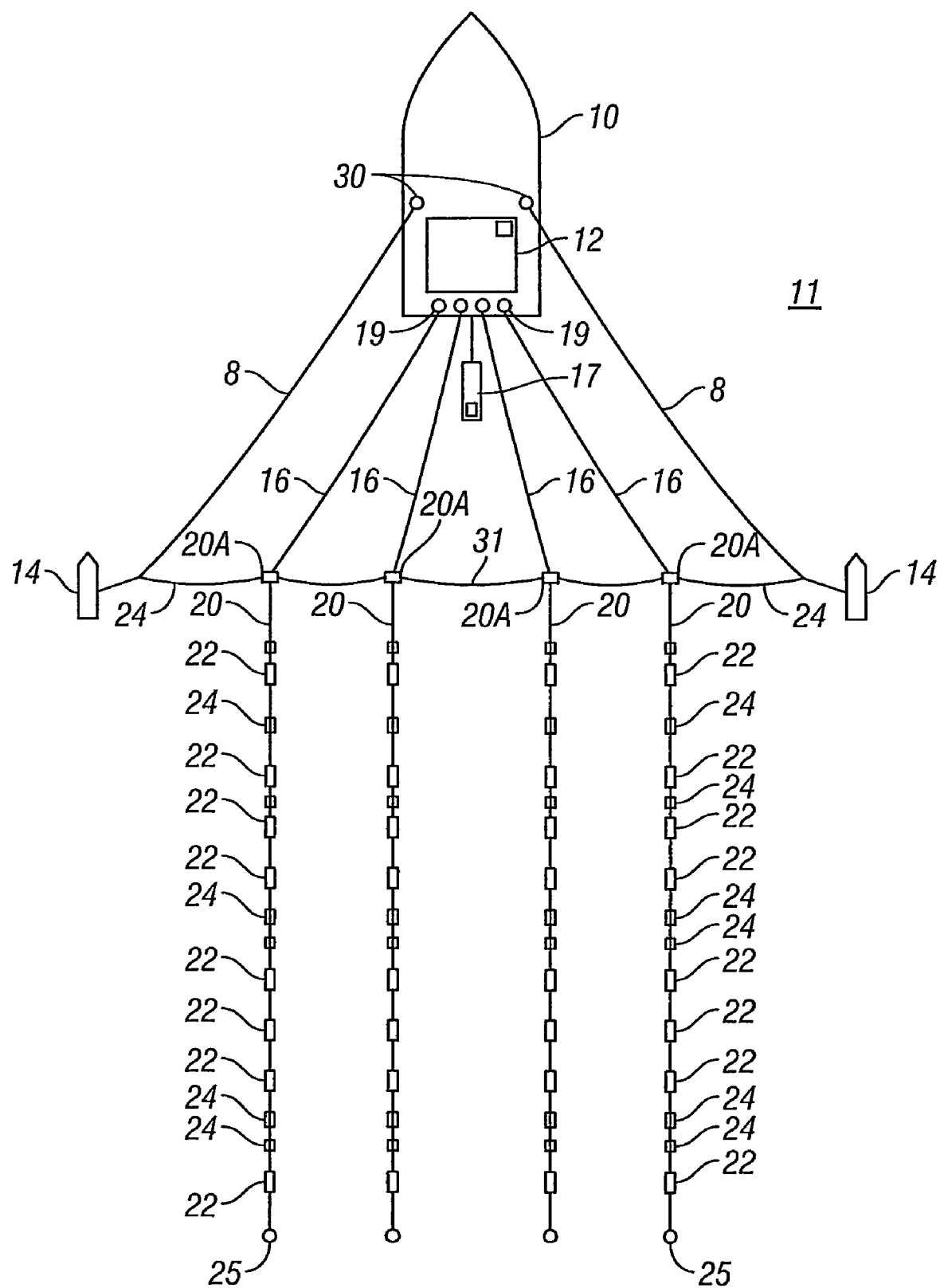
FIG. 1 shows an example marine geophysical acquisition system according to the invention.

FIG. 1 shows a typical marine geophysical survey system that may include one or a plurality of sensor streamers. The geophysical survey system includes a survey vessel 10 that moves along the surface of a body of water 11 such as a lake or an ocean. The survey vessel 10 may include thereon equipment, shown generally at 12 and for convenience collectively referred to as a "recording system." The recording system 12 typically includes devices such as a data recording unit (not shown separately) for making a record with respect to time of signals generated by various sensors, explained below, in the acquisition system. The recording system 12 also typically includes navigation equipment (not shown separately) to determine and record, at selected times, the geodetic position of the vessel 10 and each of a plurality of geophysical sensors 22 disposed at spaced apart locations on the one or more streamers 20 towed by the survey vessel 10.

The geophysical sensors 22 can be any type of geophysical sensor known in the art. Non-limiting examples of such sensors may include particle motion-responsive seismic sensors such as geophones and accelerometers, pressure-responsive seismic sensors, pressure time gradient-responsive seismic sensors, electrodes, magnetometers, temperature sensors or combinations of the foregoing. The geophysical sensors 22 may measure, for example, seismic or electromagnetic field energy primarily reflected from or refracted by various structures in the Earth's subsurface below the bottom of the water 11 in response to energy imparted into the subsurface by an energy source 17. Seismic energy, for example, may originate from a seismic energy source, or an array of such sources, deployed in the water 11 and towed by the survey vessel 10 or by another vessel. Electromagnetic energy may be provided by passing electric current through a wire loop or electrode pair (not shown for clarity). The energy source 17 may be towed in the water 11 by the survey vessel 10 or a different vessel (not shown). The recording system 12 may also include energy source control equipment (not shown separately) for actuating the energy source 17 at selected times.

In the survey system shown in FIG. 1, there are four laterally spaced apart sensor streamers 20 towed by the survey vessel 10. The number of sensor streamers shown in FIG. 1, however, is only a representative example and is not a limitation on the number of streamers that may be used in any particular method according to the invention. In marine geophysical acquisition systems such as shown in FIG. 1 that include a plurality of laterally spaced apart streamers, the streamers 20 are typically coupled to towing equipment that secures the forward end of each of the streamers 20 at a selected lateral position with respect to adjacent streamers and with respect to the seismic vessel 10. As shown in FIG. 1, the towing equipment can include one or more paravane tow ropes 8 each coupled to the vessel 10 at one end through a winch 30 or similar spooling device that enables changing the deployed length of the one or more paravane tow ropes 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. "Lateral" in the present context means transverse to the direction of motion of the survey vessel 10 in the water 11. The lateral motion component of each paravane 14 is typically opposed to that of the other paravane 14. The combined lateral motion component of the paravanes 14 separates the paravanes 14 from each other until they put into tension one or more spreader ropes or cables 24, and a center spreader rope 31 functionally coupled end to end between the paravanes 14. The paravanes 14 may have an adjustable angle of attack with respect to the direction of motion of the vessel 10 in the water. Non limiting examples of such "steerable" paravanes are described in U.S. Pat. No. 7,404,370 issued to Stokkeland. Other configurations may exclude the center spreader rope 31, may have paravanes on only one side of the vessel, or may have two or more paravanes on each side of the vessel. Accordingly, the scope of the invention is not limited use with the example configuration shown in FIG. 1.

The sensor streamers 20 can each be coupled, at the axial end thereof nearest the vessel 10 (the "forward end"), to a respective lead-in cable termination 20A. The lead-in cable terminations 20A can be coupled to or associated with the spreader ropes or cables 24 so as to fix the lateral positions of the streamers 20 with respect to each other and with respect to the centerline of the vessel 10. Electrical and/or optical connection between the appropriate components in the recording system 12 and, ultimately, the geophysical sensors 22 (and/or other circuitry) may be made using lead-in cables 16, each of which terminates in a respective lead-in cable termination 20A. A lead-in termination 20A is disposed at the forward end of each streamer 20. Each of the lead-in cables 16 may be deployed by a respective winch 19 or similar spooling device such that the deployed length of each lead-in cable 16 can be changed. The type of towing equipment coupled to the forward end of each streamer shown in FIG. 1 is only intended to illustrate a type of equipment that can tow an array of laterally spaced apart streamers in the water. Other towing structures may be used in other examples of geophysical acquisition system according to the invention.

Figure 3A:
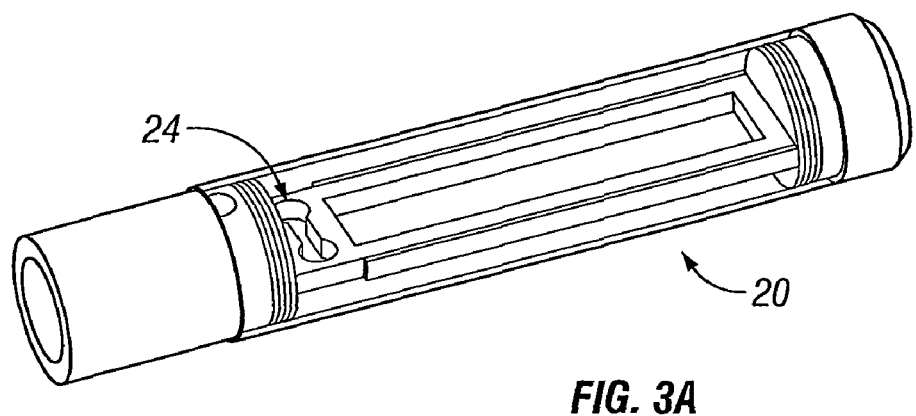
FIG. 3 shows examples of positioning of tension sensors according to various embodiments of strain monitoring systems.
Figure 3B:
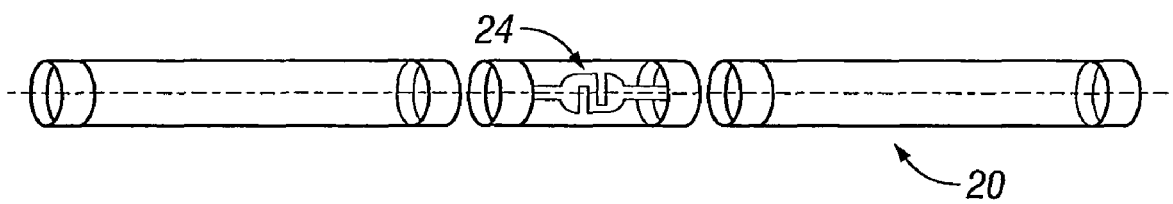
Figure 3C:
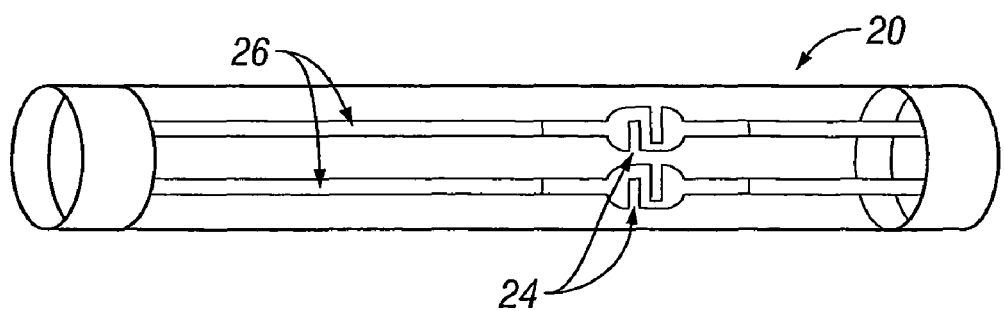

Each streamer 20 may include thereon or therein at least one, and preferably a plurality of longitudinally distributed tension sensors 24. The tension sensors 24 may be electrical strain gauges or load cell sensors, such as Wheatstone bridge type sensors. The tension sensors 24 may also be optical sensors, such as Bragg gratings etched into an optical fiber. Optical strain gauges as applied to marine geophysical acquisition systems are explained in U.S. Pat. No. 7,221,619 issued to George. The tension sensors 24 may also be hydrostatic pressure sensors such as piezoelectric type sensors. The tension sensors 24 may also be disposed in a streamer-integrated pressure vessel (see, e.g., FIG. 3A), in modules that connect the axial ends of streamer segments (see, e.g., FIG. 3B), or integrated into the streamer strain members 26 (see, e.g., FIG. 3C).

Figure 2:
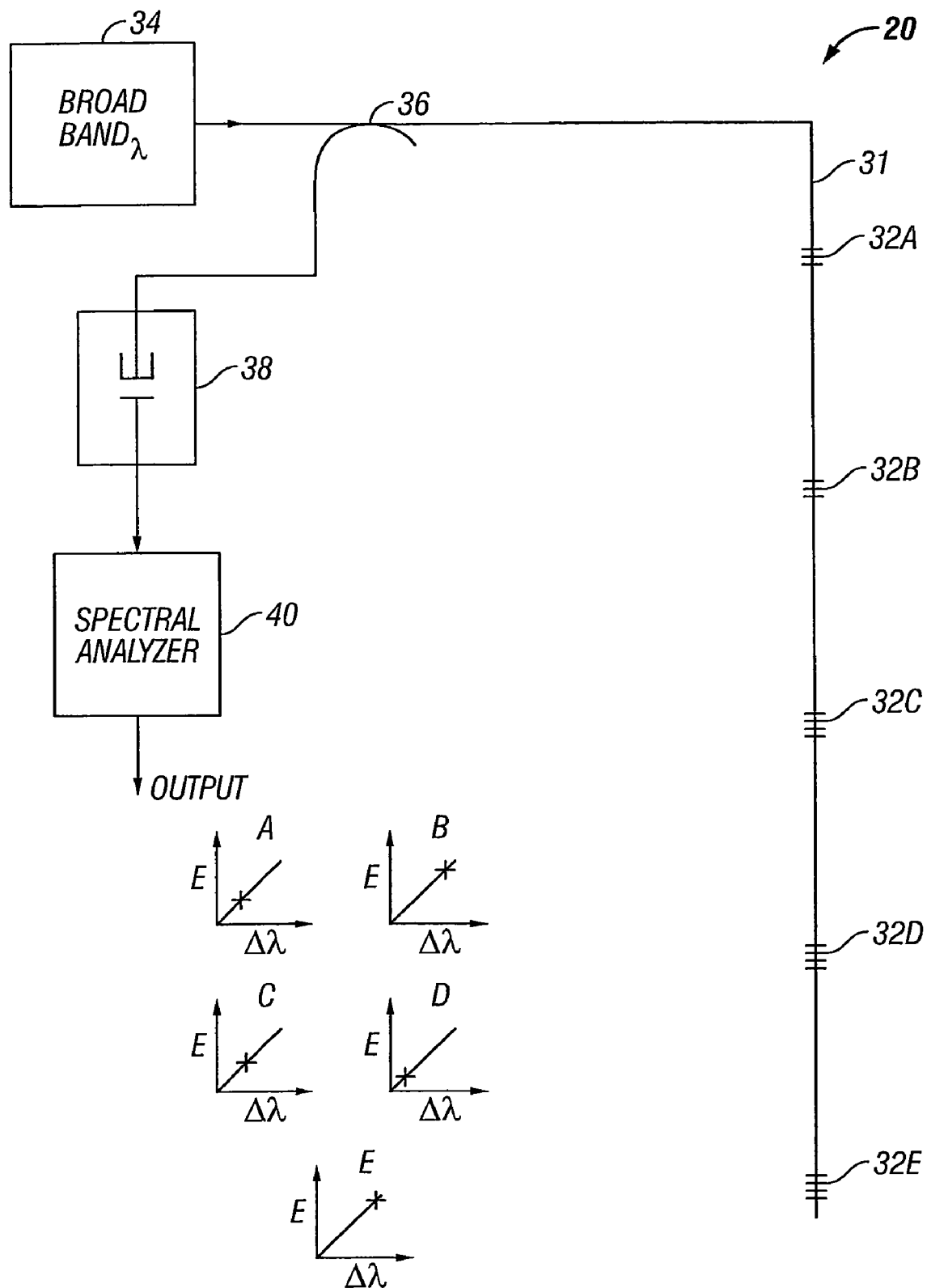
FIG. 2 shows an example strain monitoring system that may be used with the example acquisition system of FIG. 1.

One example of a tension monitoring system including a plurality of longitudinally distributed tension sensors is shown schematically in FIG. 2. A broadband light source 34, such as a laser diode, may be disposed in or near the recording system (12 in FIG. 1) or other convenient location such as on the vessel (10 in FIG. 1). The source applies broadband light to one input of an optical coupling 36. One output of the optical coupling 36 may be coupled to one end of an optical fiber 31. The optical fiber 31 may be disposed within or on the outer surface of one or more of the streamers 20. The broadband light travels along the optical fiber 31. Each tension sensor may be in the form of a Bragg grating, e.g., 32A, 32B, 32C, 32D, 32E etched into the optical fiber 31 at selected longitudinal locations. At each Bragg grating 32A, 32B, 32C, 32D, 32E on the optical fiber 31, some of the broadband light is backscattered along the optical fiber 31. The wavelength of the light backscattered by each Bragg grating will be related to the periodicity of each Bragg grating 32A, 32B, 32C, 32D, 32E. Each Bragg grating preferably has a different periodicity from the other Bragg gratings under no-strain (no axial tension) conditions, and such periodicities are preferably sufficiently different from each other that the backscattered light may be individually identified with respect to each Bragg grating under any tension applied to the streamer.

In the present example, a photodetector 38 may be coupled to one input of the optical coupling 36 to detect the backscattered light from the optical fiber 31. The photodetector 38 and broadband light source 34 may form part of or be disposed in the recording system (12 in FIG. 1). The output of the photodetector 38 may be coupled to a spectral analyzer 40 (which may also form part of or be associated with the recording system 12 in FIG. 1) so that the wavelengths of the backscattered light may be monitored. As shown in the graphs in FIG. 2, at A, B, C, D, E, each corresponding to a respective Bragg grating 32A, 32B, 32C, 32D, 32E, change in wavelength of the backscattered light, shown on the coordinate axes as $\Delta\lambda$ corresponds to cable elongation, or axial strain, at each Bragg grating, shown at E. Generally elongation will be linearly related to change in wavelength of the backscattered light, however it will be appreciated by those skilled in the art that any other relationship therebetween may be readily characterized. In some examples, it may be desirable to include at least one Bragg grating (not shown in the Figures) on the same or a different optical fiber that is arranged to be completely isolated from tension on the streamer 20. Such additional Bragg grating, isolated from tension and thus axial strain on the streamer 20, may be used to normalize the wavelength measurements from each of the strain-coupled Bragg gratings for changes in ambient temperature on the one or more streamers 20. By providing a Bragg grating at one or more selected longitudinal positions along the one or more streamers 20 and by determining change in wavelength of backscattered light, a measurement corresponding to tension can be made at the one or more positions along the streamer 20. By including a plurality of such Bragg gratings as explained above, individual measurements of axial strain at selected positions along the streamer 20, and thus the tension distribution and/or strain distribution along the streamer 20, can be determined.

In a method according to the invention, the tension and/or axial strain determined using the one or more tension sensors as explained with reference to FIG. 2 may be used to determine axial elongation of the one or more streamers at each point along the streamer. The axial elongation will be related to the elastic properties of the streamer and the amount of tension at each longitudinal position along the streamer. The axial elongation of the streamer 20 will cause corresponding change in longitudinal position of each sensor (22 in FIG. 1) with respect to the tow vessel (10 in FIG. 1). Such position information may be used to compensate or adjust measurements made by each geophysical sensor (22 in FIG. 1) in response to energy emitted by the source (17 in FIG. 1) based on the change in longitudinal position of each sensor (22 in FIG. 1). Elongation of the streamer may be calculated using a formula based on Young's modulus, for example. One such formula may be expressed as follows:

$$E \equiv \frac{\text{tensile stress}}{\text{tensile strain}} = \frac{\sigma}{\varepsilon} = \frac{F/A_0}{\Delta L/L_0} = \frac{FL_0}{A_0 \Delta L}$$

in which E is the Young's modulus (modulus of elasticity) of the streamer, F is the force applied to the streamer, $A_0$ is the original cross-sectional area of the streamer through which the force is applied, $\Delta L$ is the amount by which the length of the streamer changes, and $L_0$ is the original length of the streamer. Typically the elongation, $(\Delta L\text{-}1)*L_0$ would be measured as a function of applied force, F, and then a proportionality constant would be derived which effectively would be $A_0*E$.

In some embodiments, tension monitoring system may be integrated with the data recording unit, so that tension measurements may be made simultaneously with recording of geophysical data. For example, if geophysical data is sampled at a certain frequency, the tension monitoring system may make tension measurements at the same frequency. In such embodiments, tension measurements may be directly fed into data processing of the recorded data as an auxiliary channel to be used for dynamic and online elongation compensation. This may improve the accuracy of the elongation compensation, as the measurement may be made in close vicinity to the acquisition electronics.

Consequently, the axial elongation of the one or more streamers at each point along the streamer may be determined. This thereby provides more precise determination of the positions of the sensors relative to the energy source, with a corresponding improvement in precision of the geophysical data collected due to the compensated measurements. Such geophysical data may more precisely indicate geophysical structures and/or identify formations likely to contain useful materials such as water, oil, or natural gas.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a longitudinal position of at least one geophysical sensor on a towed marine streamer, comprising:
   measuring a parameter related to axial tension at at least one position along the streamer;
   determining a change in length of the streamer using the measured parameter; and
   determining the longitudinal position of the at least one sensor.

2. The method of claim 1 wherein the parameter comprises at least one parameter selected from the group consisting of: axial strain, tension, and any combination thereof.

3. The method of claim 1 further comprising measuring the parameter at a plurality of longitudinal positions along the streamer and determining a length distribution from the plurality of measurements of the parameter.

4. The method of claim 1 wherein the at least one geophysical sensor comprises at least one sensor selected from the group consisting of: a particle motion-responsive seismic sensor; a geophone; an accelerometer; a pressure-responsive seismic sensor; a pressure time gradient-responsive seismic sensor; an electrode; a magnetometer; a temperature sensor; and any combination thereof.

5. The method of claim 1 wherein at least one tension sensor is on the towed marine streamer, and wherein the at least one tension sensor comprises at least one sensor selected from the group consisting of an electrical strain gauge; a load cell sensor; a Wheatstone bridge type sensor; an optical sensor; a Bragg gratings etched into an optical fiber; a hydrostatic pressure sensor; a piezoelectric type sensor; and any combination thereof.

6. A method for marine geophysical surveying, comprising:
   towing at least one marine streamer in a body of water, wherein the streamer comprises at least one geophysical sensor;
   measuring a parameter related to axial tension at at least one position along the streamer;
   determining a change in length of the streamer using the measured parameter;
   at selected times actuating an energy source in the body of water;
   recording signals detected by the at least one geophysical sensor; and
   compensating the recorded signals for the determined change in length of the streamer.

7. The method of claim 6 wherein the parameter comprises at least one parameter selected from the group consisting of: axial strain, tension, and any combination thereof.

8. The method of claim 6 further comprising measuring the parameter at a plurality of longitudinal positions along the streamer and determining a length distribution from the plurality of measurements of the parameter.

9. The method of claim 6, wherein the parameter is measured simultaneously with the recording of the signals.

10. The method of claim 6 wherein the at least one geophysical sensor comprises at least one sensor selected from the group consisting of: a particle motion-responsive seismic sensor; a geophone; an accelerometer; a pressure-responsive seismic sensor; a pressure time gradient-responsive seismic sensor; an electrode; a magnetometer; a temperature sensor; and any combination thereof.

11. The method of claim 6 wherein at least one tension sensor is on the at least one marine streamer, and wherein the at least one tension sensor comprises at least one sensor selected from the group consisting of: an electrical strain gauge; a load cell sensor; a Wheatstone bridge type sensor; an optical sensor; a Bragg gratings etched into an optical fiber; a hydrostatic pressure sensor; a piezoelectric type sensor; and any combination thereof.

12. A marine streamer, comprising:
at least one geophysical sensor; and
at least one tension sensor capable of measuring a parameter related to axial tension,
wherein the at least one tension sensor is disposed in a streamer-integrated pressure vessel, is disposed in a module capable of connecting axial ends of streamer segments, the marine streamer comprising a plurality of streamer segments, or is integrated into a streamer strain member.

13. The streamer of claim 12 wherein the parameter comprises at least one parameter selected from the group consisting of: axial strain, tension, and any combination thereof.

14. The streamer of claim 12 wherein the at least one geophysical sensor comprises at least one sensor selected from the group consisting of: a particle motion-responsive seismic sensor; a geophone; an accelerometer; a pressure-responsive seismic sensor; a pressure time gradient-responsive seismic sensor; an electrode; a magnetometer; a temperature sensor; and any combination thereof.

15. The streamer of claim 12 wherein the at least one tension sensor comprises at least one sensor selected from the group consisting of: an electrical strain gauge; a load cell sensor; a Wheatstone bridge type sensor; an optical sensor; a Bragg gratings etched into an optical fiber; a hydrostatic pressure sensor; a piezoelectric type sensor; and any combination thereof.

16. The streamer of claim 12 wherein the at least one tension sensor is disposed in the streamer-integrated pressure vessel.

17. The streamer of claim 12 wherein the at least one tension sensor is disposed in the module capable of connecting axial ends of the streamer segments.

18. The streamer of claim 12 wherein the at least one tension sensor is integrated into the streamer strain member.

19. The method of claim 1, wherein the step of measuring a parameter related to axial tension comprises detecting backscattered light from at least one tension sensor on the towed marine streamer.

20. The method of claim 6, wherein the step of measuring a parameter related to axial tension comprises detecting backscattered light from at least one tension sensor on the marine streamer.

* * * * *